US006765316B1

(12) United States Patent
Elsner et al.

(10) Patent No.: US 6,765,316 B1
(45) Date of Patent: Jul. 20, 2004

(54) METHOD FOR AVERAGING OUT OVERALL BURN UP IN AN ELECTROMAGNETIC SWITCHING DEVICE AND A CORRESPONDING ELECTROMAGNETIC SWITCHING DEVICE

(75) Inventors: Norbert Elsner, Bubenreuth (DE); Gerd Griepentrog, Gutenstetten (DE); Reinhard Herbst, Wernberg-Koeblitz (DE); Reinhard Maier, Herzogenaurach (DE); Norbert Mitlmeier, Ursensollen (DE); Diethard Runggaldier, Stegaurach (DE); Christian Schreckinger, Koetzting (DE); Bernhard Streich, Amberg (DE)

(73) Assignee: Siemens Aktiengesellschaft, Munich (DE)

( * ) Notice: Subject to any disclaimer, the term of this patent is extended or adjusted under 35 U.S.C. 154(b) by 269 days.

(21) Appl. No.: 10/110,113

(22) PCT Filed: Oct. 9, 2000

(86) PCT No.: PCT/DE00/03539

§ 371 (c)(1), (2), (4) Date: Apr. 8, 2002

(87) PCT Pub. No.: WO01/27951

PCT Pub. Date: Apr. 19, 2001

(30) Foreign Application Priority Data

Oct. 8, 1999 (DE) ........................................ 199 48 551

(51) Int. Cl.[7] .................................................. H02H 3/26

(52) U.S. Cl. ...................................................... 307/130

(58) Field of Search ................................ 307/116, 125, 307/130; 361/127, 139, 152

(56) References Cited

U.S. PATENT DOCUMENTS

| | | | | | |
|---|---|---|---|---|---|
| 3,832,657 | A | * | 8/1974 | Hardman et al. | 335/99 |
| 5,440,180 | A | | 8/1995 | DeVault et al. | |
| 5,530,613 | A | * | 6/1996 | Bauer et al. | 361/58 |
| 5,617,281 | A | * | 4/1997 | Bauer et al. | 361/27 |
| 5,684,668 | A | * | 11/1997 | Muramatsu et al. | 361/185 |
| 2001/0019268 | A1 | | 9/2001 | Pohl et al. | |
| 2002/0081241 | A1 | | 6/2002 | Sigling | |

FOREIGN PATENT DOCUMENTS

| | | |
|---|---|---|
| DE | 196 03 310 A1 | 8/1997 |
| DE | 199 29 765 A1 | 1/2001 |

* cited by examiner

*Primary Examiner*—Adolf Berhane
(74) *Attorney, Agent, or Firm*—Harness, Dickey & Pierce, P.L.C.

(57) ABSTRACT

An electromagnetic switching device includes a contact arrangement with three contacts which couple a three-phase load to three phases of a three-phase power supply system, and disconnect the three-phase load from the three phases. Switching erosion takes place on the contacts. An overall erosion is determined for each contact, and is supplied to a drive circuit. The contact arrangement is operated by the drive circuit as a function of the overall erosion such that the overall erosion of the contacts are approximated to one another.

21 Claims, 4 Drawing Sheets

METHOD FOR AVERAGING OUT OVERALL BURN UP IN AN ELECTROMAGNETIC SWITCHING DEVICE AND A CORRESPONDING ELECTROMAGNETIC SWITCHING DEVICE

This application is the national phase under 35 U.S.C. § 371 of PCT International Application No. PCT/DE00/03539 which has an International filing date of Oct. 9, 2000, which designated the United States of America, the entire contents of which are hereby incorporated by reference.

FIELD OF THE INVENTION

The present invention generally relates to a method for equalizing overall erosion of a contact arrangement in an electromagnetic switching device, and to an electromagnetic switching device corresponding to it. In particular, the électromagnetic switching device may be a contactor, having a number of contacts.

BACKGROUND OF THE INVENTION

Methods and the corresponding switching devices are known, for example, from DE 44 34 074 A1 and from U.S. Pat. No. 5,440,180.

Electromagnetically operated switching devices, that is to say contactors and relays, have erosion during each switching process. This is referred to in the following text as switching erosion. In this case, multipole switching devices whose main contacts switch a three-phase system are in practice subject to different contact wear. This leads to failure of the switching device, and one of the contacts becoming unserviceable. This represents a considerable restriction to the life of the switching device, because the other contacts would still frequently continue to be serviceable for some time.

This phenomenon, which is referred to as the synchronization effect, is due to the fact that the contacts which are subjected to the erosion are switched at times which are statistically not uniformly distributed with respect to the phases being switched. The synchronization effect may be caused firstly by being driven in synchronism with the power supply system or else by the switching device drive having its own response (so-called autosynchronization). Mechanical tolerances in the switching device can also result in such synchronization.

Drive systems fed with direct current and electronically controlled drive systems can be used for the switching device in order to reduce autosynchronization. Furthermore, "Schaltsynchronisationseffekt bei AC-betätigten Schütten" [The switching synchronization effect in AC-operated contactors] (G. Griepentrog in VDE specialist report 51, 14th Contact Seminar, 09.24–26. 1997 at Karlsruhe) proposes that the drive unit for the switching device, that is to say the drive coil, be connected to a capacitance. However, this cannot prevent external synchronization processes.

In the prior art mentioned initially, it is proposed that the switching commands be delayed so as to produce a uniform distribution of the switching angles. However, when mechanical tolerances are present, this method is not able either to ensure uniform erosion of all the contacts.

SUMMARY OF THE INVENTION

An object of an embodiment of the present invention is to provide an operating method for an electromagnetic switching device, and/or to provide an electromagnetic switching device which corresponds to it. Preferably, in the method and/or switching device, uniform erosion of the contacts is always ensured.

An object may be achieved in that the respective overall erosion is determined for each contact, in that the overall erosion is supplied to a drive circuit, and/or in that the contact arrangement is operated by the drive circuit as a function of the determined (accumulated) overall erosion such that the overall erosion of the contacts are approximated to one another.

In a corresponding manner to this, an object may be achieved for the electromagnetic switching device in that the switching device has an overall erosion determining circuit via which the respective overall erosion can be determined for each contact; in that the overall erosion determining circuit is connected to, such that it can communicate with, a drive circuit; and/or in that the contact arrangement can be operated by the drive circuit as a function of the determined overall erosion, such that the overall erosion of the contacts are equalized.

The overall erosion of a contact can be the sum of the switching erosion of the contact.

Methods for determining the overall erosion are described, for example, in DE 44 27 006 A1, DE 196 03 310 A1 and DE 196 03 319 A1.

The approximation of the overall erosion of the contacts can be achieved, for example, by supplying the drive circuit with a drive command and with a reference signal which has a predetermined phase relationship with one of the three phases in a three-phase power supply system, by the contact arrangement being operated by the drive circuit with the drive command being supplied with a switching delay with respect to the reference signal, and/or by the switching delay being established by the drive circuit.

The method for approximating the overall erosion can be particularly simple when the drive circuit determines that contact which has the greatest overall erosion and the drive circuit establishes the switching delay such that the switching erosion of that contact which has the greatest overall erosion is minimized.

In this case, a control process thus takes place such that that contact which is most heavily affected by overall erosion at any given time has its load decreased by changing the switching angle until another contact has the greatest overall erosion at that time. This necessarily results in all three contacts having uniform overall erosion.

In certain types of switching devices, it is possible to carry out a series of tests in advance and hence to determine the switching erosion of the individual contacts as a function of the switching instant. This functionality can then be stored in a memory table, for example, so that a suitable switching delay for a given overall erosion can be established simply by addressing the memory table (look up).

However, it may be even better if the contact which has the greatest overall erosion couples a first phase to a three-phase load and that contact which has the medium overall erosion couples a second phase to a three-phase load. These contacts can then disconnect these respective phases from the three-phase load. The second phase may have a phase offset with respect to the first phase, and the switching delay may be increased by the phase offset.

This is because no prior knowledge of the switching device behavior, in particular of the switching erosion, may be required in this case. There is thus no need to carry out any test series. The method can be applied to all contactor types, and is self-adapting.

If the switching delay is retained for a predetermined number of drive commands after reestablishing the switching delay, the operating method operates in a particularly reliable and stable manner.

Alternatively or in addition, it is possible for the switching delay to be retained after reestablishing the switching delay until the difference between the greatest overall erosion and the least overall erosion reaches or exceeds a threshold value.

One possible way to establish the overall erosion of the contacts during normal operation is, for example, to operate the contact arrangement by a moving contact support, to detect a reference time at which the contact support assumes a reference position when the contact arrangement is opened, to record contact times at which the contacts open, and to determine the overall erosion from the differences between the contact times and the reference time.

BRIEF DESCRIPTION OF THE DRAWINGS

Further advantages and details result from the following description of an exemplary embodiment. In this case, illustrated in outline form.

DETAILED DESCRIPTION OF THE PREFERRED EMBODIMENTS

Figure 1:
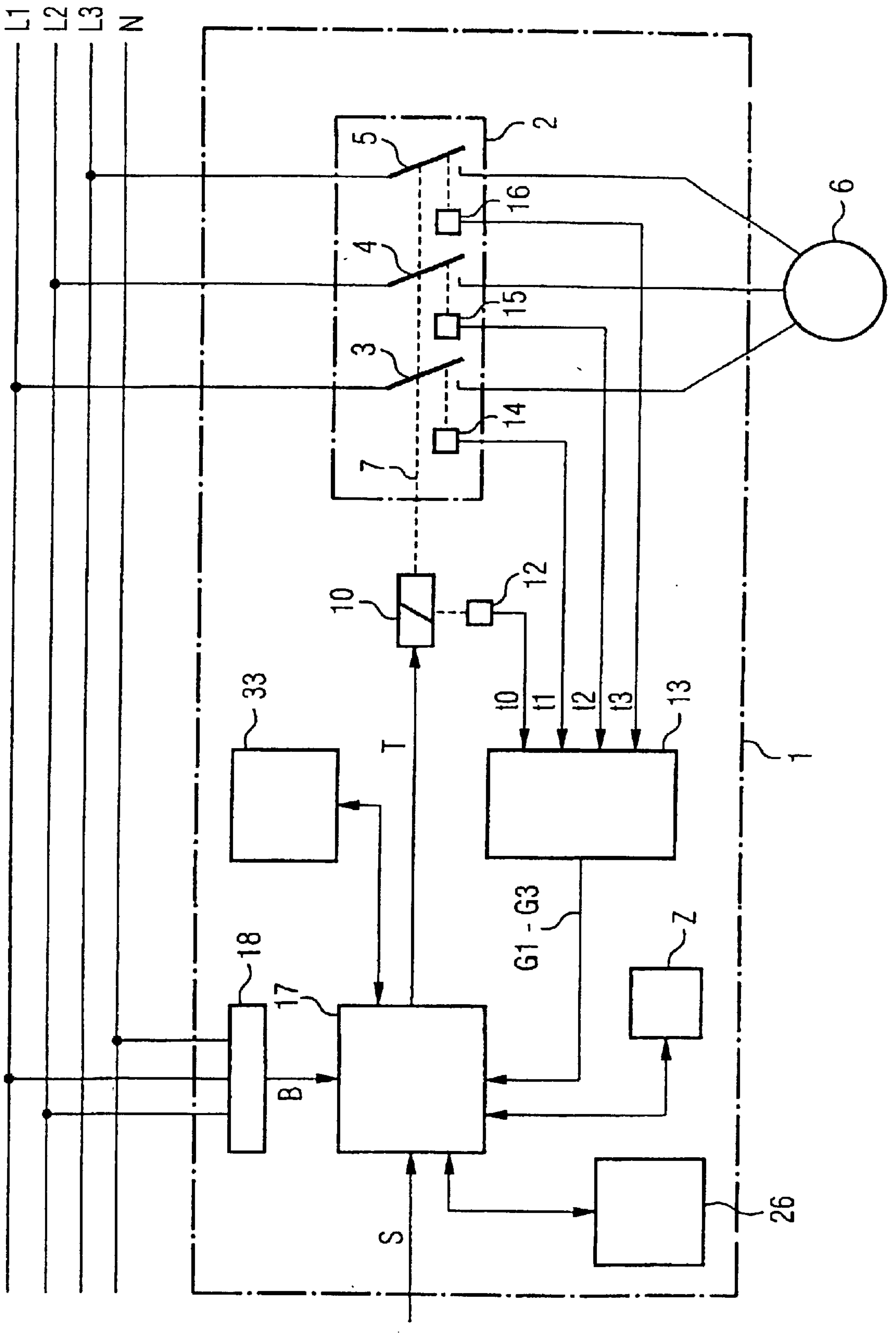
FIG. 1 shows a load circuit with an electromechanical switching device.

FIG. 1 shows an electromagnetic switching device 1 in the form of a contactor 1. This has a contact arrangement 2 with three contacts 3–5. A three-phase load 6 can be coupled to three phases L1–L3 of a three-phase power supply system via the contacts 3–5, and can be disconnected from the three phases L1–L3 via the contacts 3–5, when the switching device 1 is operated. When the contact arrangement 2 is operated, that is to say when the contacts 3–5 are opened or closed, switching erosion occur on the contacts 3–5 during each switching process.

Figure 2:
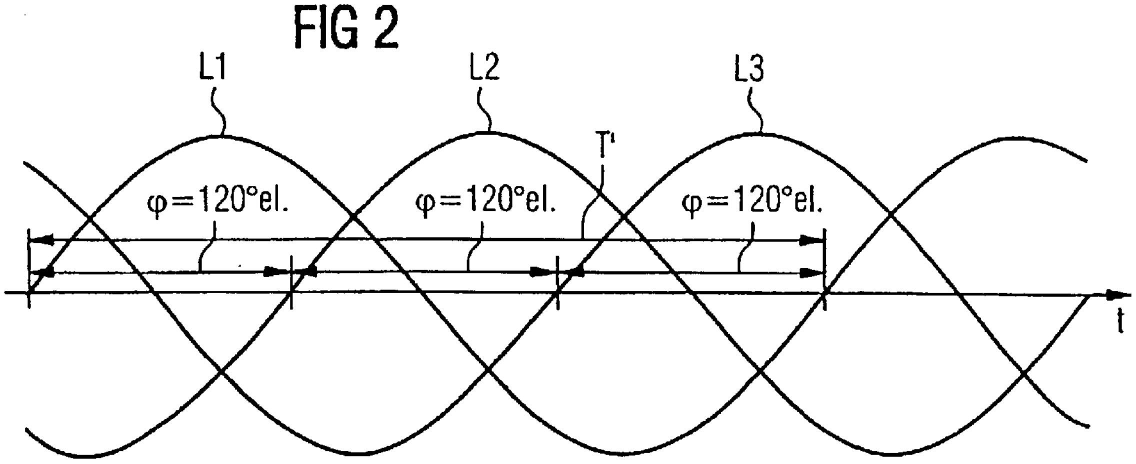
FIG. 2 shows a phase diagram.

The three-phase power supply system also has a neutral conductor N, in addition to the three phases L1, L2, L3. FIG. 2 shows the voltage waveforms of the phases L1–L3 with respect to the neutral conductor N plotted against time t. In FIG. 2, the phases L1–L3 have a relative phase offset ϕ of ±120° electrical to one another. The phase offset ϕ between the phase L3 and the phase L2, between the phase L2 and the phase L1, and between the phase L1 and the phase L3 is +120°. The phase offset ϕ between the phase L3 and the phase L1, between the phase L1 and the phase L2, and between the phase L2 and the phase L3 is −120° or +240° electrical. Since the phases L1–L3 are established only modulo 360° electrical, the phase offset ϕ between the phase L3 and the phase L1, between the phase L1 and the phase L2, and between the phase L2 and the phase L3 can also be expressed as +240° electrical.

Figure 3:
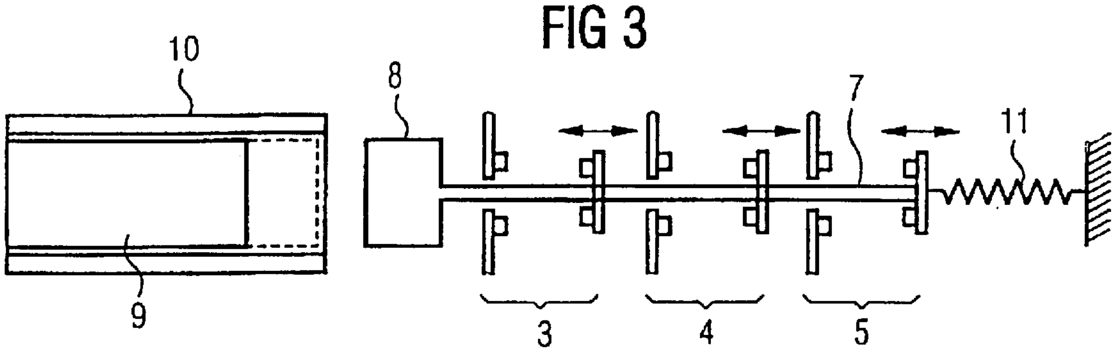
FIG. 3 shows a part of the electromechanical switching device from FIG. 1.

FIG. 3 shows the contact arrangement 2 operated by a moving contact support 7. The contact support 7 is attached to an armature 8, which is attracted by an iron core 9 of a coil 10 when current flows through the coil 10. In this case, the contact support 7 is shifted such that the armature 8 assumes the position indicated by dashed lines in FIG. 3. In the unoperated state, the contact support 7 is held in the illustrated position via a restoring spring 11. In this position, the contacts 3–5 are open.

The contacts 3–5 are identical. The following text will therefore describe in more detail only the contact 3, in conjunction with FIG. 4. However, what is said with regard to contact 3 is also applicable in an analogous manner to the contacts 4 and 5.

Figure 4:
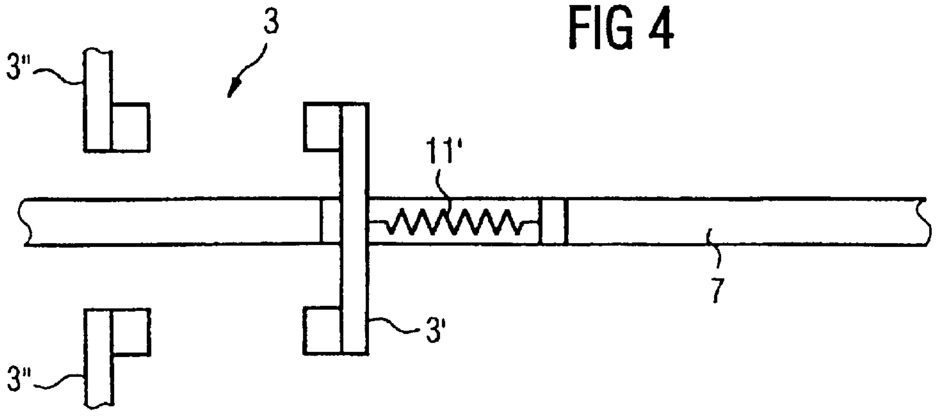
FIG. 4 shows a contact.

In FIG. 4, the contact 3 has a contact link 3' and a mating contact 3". The mating contact 3" is arranged such that it is rigid. In contrast, the contact link 3" is connected to the contact support 5 such that it can move. This is indicated by the arrows for the contacts 3–5 in FIG. 3.

The contact link 3' is spring-loaded by a compression spring 11'. The compression spring 11' has a considerably higher spring constant than the restoring spring 11. The compression spring 11' essentially governs the contact force with which the contact link 3' makes contact with the mating contact 3" when the contact 3 is closed. In particular, it is independent of overall erosion G1–G3 which occur on the contacts 3–5.

When the contact arrangement 2 opens, the armature 8 is first of all detached from the iron core 9. The contacts 3–5 then open. When the contacts 3–5 open, a characteristic voltage pulse is produced on each of the contacts 3–5, and this is recorded by contact timers 14–16. The recording of these voltage pulses defines contact times t1–t3. The contact times t1–t3 are thus established by the opening of the contacts 3–5. In contrast to the contact force, which is essentially independent of the overall erosion G1–G3, the contact times t1–t3 are functionally related to the overall erosion G1–G3. The contact times t1–t3 are thus transmitted to an overall erosion determining circuit 13.

When the armature 8 is detached from the iron core 9, this likewise produces a voltage pulse in the coil 10, and this voltage pulse is recorded by a reference timer 12 and is likewise transmitted to the overall erosion determining circuit 13. The recording of the voltage pulse defines a reference time t0. The reference time t0 is thus governed by the time at which the armature 8 is detached from the iron core 9, while the reference position is governed by the position that the contact support assumes at the reference time t0.

The overall erosion determining circuit 13 forms the differences between the contact times t1–t3 and the reference time t0, and uses these differences to determine the overall erosion G1–G3. Details of the overall erosion determining process can be found from the prior art according to DE 44 27 006 A1, DE 196 03 310 A1 and DE 196 03 319 A1.

A specific overall erosion G1–G3 is thus determined for each contact 3–5. The overall erosion G1–G3 are passed to a drive circuit 17, which is connected to, such that it can communicate with, the overall erosion determining circuit 13.

A reference signal transmitter 18 is also connected to the drive circuit 17, and is connected to two of the phases L1–L3, or to one of the phases L1–L3 and to the neutral conductor N. It can thus form a potential difference and can use this to determine a reference signal B, which it passes to the drive circuit 17.. The reference signal B then has a predetermined phase relationship with respect to the three phases L1–L3. By way for example, the reference signal transmitter 18 can emit a reference signal B whenever the potential difference recorded by it changes its mathematical sign, or on each potential change from minus to plus.

Figure 5:
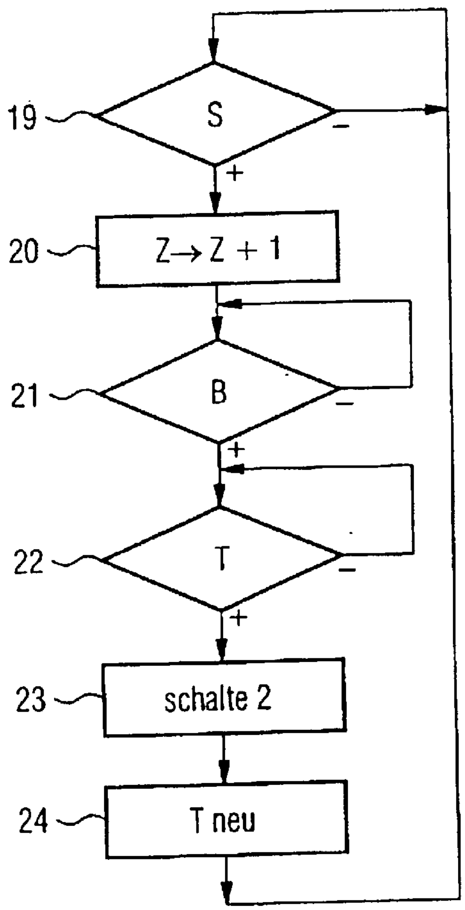
FIG. 5 shows a flowchart.

As shown in FIG. 5, the drive circuit 17 is supplied with a drive command S in a step 19. The supplying of the drive command S firstly results in incrementation of a counter Z in a step 20. The process then waits, in a step 21, until the next reference signal B is transmitted from the reference signal transmitter 18. Once the reference signal B has been received, the process waits, in a step 22, for a switching delay T to elapse, before the contact arrangement 2 is then operated in a step 23. Finally, the switching delay T is recalculated in a step 24. The switching delay T is in this case established by the drive circuit 17 as a function of the overall erosion G1–G3 supplied to it, such that the overall erosion G1–G3 of the contacts 3–5 are approximated to one another.

Figure 6:
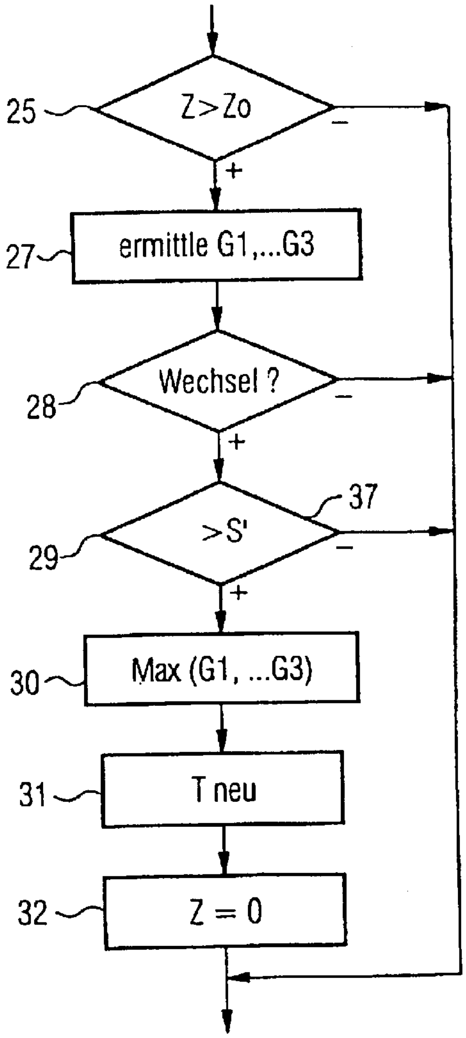
FIG. 6 shows a detail from FIG. 5.

The process of determining the (new) switching delay T is carried out such that, as shown in FIG. 6, a check is first of all carried out in a step 25 to determine whether the counter Z has reached a minimum count Z0. The minimum count Z0 is typically between 1 000 and 10 000, for example, between 3 000 and 5 000. The switching delay T is reestablished only when the count Z passes the minimum count Z0. Otherwise, an inhibiting device 26 prevents the switching delay T from being reestablished. This switching delay T is thus retained in this case.

When the switching delay T is intended to be reestablished, the overall erosion G1–G3 of the contacts 3–5 are then checked by the overall erosion determining device 13, in a step 27. A check is then carried out in a step 28 to determine whether the ratio of the overall erosion G1–G3 with respect to one another has changed since the last determination of the switching delay T. If not, the further process of reestablishing the switching delay T is terminated. A check is then carried out in a step 29 to determine whether the difference between the greatest overall erosion (for example 61) and the least overall erosion (for example G3) has reached or exceeded a threshold value S'. The threshold value S' is in this case chosen such that it is considerably greater than the measurement accuracy limit. By way of example, the threshold value S' may be ten times the measurement accuracy limit. The inhibiting device 26 allows the further reestablishment of the switching delay T only when the threshold value S' has been reached or exceeded. Otherwise, the inhibiting device 26 inhibits the reestablishment of the switching delay T.

That contact which has the greatest overall erosion is then determined in a step 30, for example the contact 3. Finally, in a step 31, the switching delay T is reestablished by the drive circuit 17 such that the switching erosion of that contact which has the greatest overall erosion, in this case the contact 3, is minimized. Lastly, in a step 32, the counter Z is set to the value zero.

The simplest way to reestablish the switching delay T is for the drive circuit 17 to have an associated memory table 33, from which the new switching delay T can be taken directly. The contents of the memory table 33 may have been determined, in particular, from test series during which the switching erosion of the individual contacts 3–5 was determined as a function of the switching instant. With the test results being stored in a suitable manner, a suitable new switching delay T can then be established for given overall erosion G1–G3 simply by addressing the memory table 33 (look up).

Figure 7:
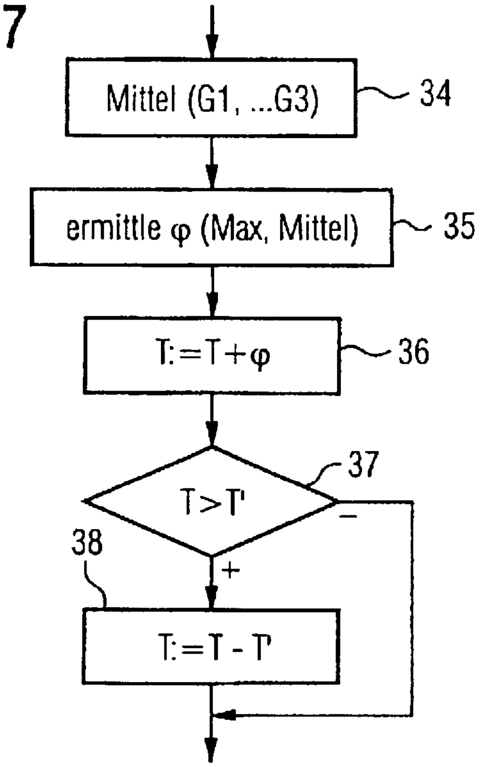
FIG. 7 shows a detail from FIG. 6.

However, it is more reliable to establish the new switching delay T using the method shown in FIG. 7.

According to FIG. 7, that contact which has the medium overall erosion, for example the contact 4, is determined in a step 34. That contact which has the greatest overall erosion, in this case the contact 3, couples a first phase, in this case the phase L1, to the three-phase load 6, and disconnects that phase from it. That contact which has the medium overall erosion, in this case the contact 4, couples a second phase, in this case the phase L2 to the three-phase load 6, and disconnects this phase from it. The second phase L2 has a phase offset ϕ with respect to the first phase L1. This phase offset ϕ is determined in a step 35. The new switching delay T is then determined by increasing the previous switching delay T by the phase offset ϕ, in a step 36.

According to the exemplary embodiment, the three-phase power supply system is in the form of a positive phase sequence three-phase power supply system, that is to say the phase L3 lags the phase L2 by 120° electrical, and the phase L2 lags the phase L1 by 120° electrical. In this case, the switching delay T is increased by 120° electrical for the sequences greatest/medium/least overall erosion on the contacts 3/4/5, 4/5/3 and 5/3/4. The switching delay T is increased by 240° electrical for the sequences 5/4/3, 4/3/5 and 3/5/4.

If, conversely, the three-phase power supply system were in the form of a negative phase sequence three-phase power supply system, the phase L1 would lag the phase L2 by 120° electrical, and the phase L2 would lag the phase L3 by 120° electrical. In this case, the switching delay T would be increased by 120° electrical for the sequences greatest/medium/least overall erosion on the contacts 5/4/3, 4/3/5 and 3/5/4. The switching delay T would be increased by 240° electrical for the sequences 3/4/5, 4/5/3 and 5/3/4.

The increase in the switching delay T now indicates that it is possible for this switching delay T to be greater than one period T' (see FIG. 2) of the three-phase power supply system. This is checked in a step 37. If necessary, the new switching delay T is then reduced by one period T' of the three-phase power supply system, in a step 38.

The process of increasing the switching delay T by the phase offset ϕ results in the switching erosion of the contacts 3–5 being interchanged cyclically. Now, during subsequent switching processes, that contact which previously had the greatest overall erosion is subjected to the least switching erosion, that which previously had the medium overall erosion is subjected to the greatest switching erosion, and that which previously had the least overall erosion is subjected to the medium switching erosion.

FIG. 1 shows the drive circuit 17, the overall erosion determining circuit 13, the inhibiting device 26, the memory table 33 and the counter Z as separate components. However, they may also be integrated in a single microchip.

The operating method according to an embodiment of the invention can in principle be used both for coupling and for disconnecting the phases L1–L3. However, it is used at least for disconnection.

Figure 8:
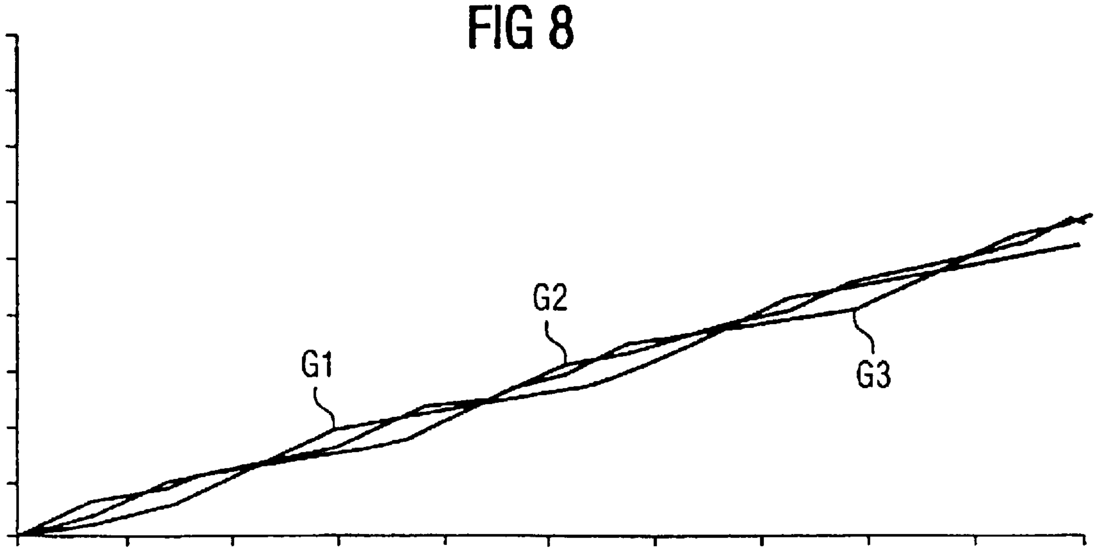
FIG. 8 shows an overall erosion profile.

FIG. 8 shows an example of a result from using the operating method according to an embodiment of the invention. The number of switching commands S is plotted, in relative units, toward the right in FIG. 8, with the overall erosion G1–G3 of the contacts 3–5 being plotted upward. As can clearly be seen, the overall erosion G1–G3 rise virtually uniformly for all the contacts 3–5. This thus considerably increases the life of the contact arrangement 2, and hence of the switching device 1 overall.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for equalizing overall erosion of a contact arrangement in an electromagnetic switching device including a plurality of contacts, comprising:

determining respective overall erosion for each contact;

supplying the determined overall erosion to a drive circuit; and operating the contact arrangement by the drive circuit as a function of the determined overall erosion such that the overall erosion of the contacts are approximated to one another.

2. The method as claimed in claim 1, wherein the drive circuit is supplied with a drive command and with a reference signal which has a predetermined phase relationship with one of the three phases in a three-phase power supply system, wherein the contact arrangement is operated by the drive circuit with the drive command being supplied with a switching delay with respect to the reference signal, and wherein the switching delay is established by the drive circuit.

3. The method as claimed in claim 2, wherein the drive circuit determines the contact which has the relatively greatest overall erosion, and wherein the drive circuit establishes the switching delay such that the switching erosion of the contact which has the relatively greatest overall erosion is minimized.

4. The method as claimed in claim 2, wherein the switching delay is obtained from a memory table.

5. The method as claimed in claim 2, wherein the contact which has the relatively greatest overall erosion couples a first phase to a three-phase load, the contact which has the relatively medium overall erosion couples a second phase to a three-phase load, and these contacts disconnect these respective phases from the three-phase load, wherein the second phase includes a phase offset with respect to the first phase, and wherein the switching delay is increased by the phase offset.

6. The method as claimed in claim 2, wherein the switching delay is retained for a predetermined number of drive commands after reestablishing the switching delay.

7. The method as claimed in claim 2, wherein the switching delay is retained after reestablishing the switching delay until the difference between the relatively greatest overall erosion and the relatively least overall erosion at least reaches a threshold value.

8. The method as claimed in claim 1, wherein the contact arrangement is operated by a moving contact support, wherein a reference time is detected at which the contact support assumes a reference position when the contact arrangement is opened, wherein contact times are recorded at which the contacts open, and wherein the overall erosions are determined from the differences between the contact times and the reference time.

9. The method as claimed in claim 3, wherein the switching delay is obtained from a memory table.

10. The method as claimed in claim 3, wherein the contact which has the relatively greatest overall erosion couples a first phase to a three-phase load, the contact which has the relatively medium overall erosion couples a second phase to a three-phase load, and these contacts disconnect these respective phases from the three-phase load, wherein the second phase includes a phase offset with respect to the first phase, and wherein the switching delay is increased by the phase offset.

11. An electromagnetic switching device including a contact arrangement with a plurality of contacts, comprising:

an overall erosion determining circuit, adapted to determine a respective overall erosion for each contact, wherein the overall corrosion determining circuit is connected to a drive circuit, and wherein the contact arrangement is adapted to be operated by the drive circuit as a function of the determined overall erosion, such that the overall erosion of the contacts is approximated to one another.

12. The switching device as claimed in claim 11, wherein the drive circuit is adapted to be supplied with a drive command and with a reference signal which has a predetermined phase relationship with one of the three phases in a three-phase power supply system, wherein the contact arrangement is adapted to be operated by the drive circuit with the drive command being supplied with a switching delay with respect to the reference signal, and wherein the switching delay is adapted to be established by the drive circuit.

13. The switching device as claimed in claim 12, wherein the drive circuit is adapted to determine the contact which has the relatively greatest overall erosion, and wherein the switching delay is adapted to be established such that the switching erosion of the contact which has the relatively greatest overall erosion can be minimized.

14. The switching device as claimed in claim 13, wherein the drive circuit includes an associated memory table from which the switching delay can be taken.

15. The switching device as claimed in claim 12, wherein a first phase is adapted to be coupled to a three-phase load via the contact which has the relatively greatest overall erosion, a second phase is adapted to be coupled to the three-phase load via the contact which has the relatively medium overall erosion, and these contacts are adapted to disconnect these respective phases from the three-phase load, wherein the second phase has a phase offset with respect to the first phase, and wherein the switching delay is adapted to be increased by the phase offset.

16. The switching device as claimed in claim 12, wherein the switching device has an inhibiting device, via which the reestablishment of the switching delay is inhibitable for a predetermined number of drive commands.

17. The switching device as claimed in claim 12, wherein the switching device has an inhibiting device, via which the process of reestablishing the switching delay inhibitable until the difference between the relatively greatest overall erosion and the relatively least overall erosion at least reaches a threshold value.

18. The switching device as claimed in claim 11, wherein the switching device has a moving contact support, via which the contact arrangement is operable, wherein the switching device has a reference timer, via which a reference time, at which the contact support assumes a reference position, is transmittable to the overall erosion determining circuit when the contact arrangement is opened, wherein the switching device has contact timers, via which contact times at which the contacts are open are transmittable to the overall erosion determining circuit when the contact arrangement opens, and wherein the overall erosion determining circuit is adapted to determine the overall erosion from the differences between the contact times and the reference time.

19. The switching device as claimed un claim 11, wherein the switching device is a contactor.

20. The switching device as claimed in claim 13, wherein a first phase is adapted to be coupled to a three-phase load via the contact which has the relatively greatest overall erosion, a second phase is adapted to be coupled to the three-phase load via the contact which has the relatively medium overall erosion, and these contacts are adapted to disconnect these respective phases from the three-phase load, wherein the second phase has a phase offset with respect to the first phase, and wherein the switching delay is adapted to be increased by the phase offset.

21. The switching device as claimed in claim 14, wherein a first phase is adapted to be coupled to a three-phase load via the contact which has the relatively greatest overall erosion, a second phase is adapted to be coupled to the three-phase load via the contact which has the relatively medium overall erosion, and these contacts are adapted to disconnect these respective phases from the three-phase load, wherein the second phase has a phase offset with respect to the first phase, and wherein the switching delay is adapted to be increased by the phase offset.

* * * * *